(12) United States Patent
Nogami et al.

(10) Patent No.: US 8,374,342 B2
(45) Date of Patent: Feb. 12, 2013

(54) SCALAR MULTIPLIER AND SCALAR MULTIPLICATION PROGRAM

(75) Inventors: Yasuyuki Nogami, Okayama (JP); Yumi Sakemi, Okayama (JP); Yoshitaka Morikawa, Okayama (JP)

(73) Assignee: National University Corporation Okayama University, Okayama-shi (JP)

( * ) Notice: Subject to any disclaimer, the term of this patent is extended or adjusted under 35 U.S.C. 154(b) by 31 days.

(21) Appl. No.: 13/129,953

(22) PCT Filed: Nov. 30, 2009

(86) PCT No.: PCT/JP2009/070127
§ 371 (c)(1),
(2), (4) Date: Jul. 14, 2011

(87) PCT Pub. No.: WO2010/061951
PCT Pub. Date: Jun. 3, 2010

(65) Prior Publication Data
US 2011/0261955 A1     Oct. 27, 2011

(30) Foreign Application Priority Data
Nov. 28, 2008  (JP) ................. 2008-305121

(51) Int. Cl.
*H04K 1/00*   (2006.01)
*H04L 9/00*   (2006.01)
*H04L 9/28*   (2006.01)

(52) U.S. Cl. .......................................... 380/28

(58) Field of Classification Search ............. 380/28
See application file for complete search history.

(56) References Cited

FOREIGN PATENT DOCUMENTS

| JP | 2004-271792 | 9/2004 |
|---|---|---|
| JP | 2006-184831 | 7/2006 |
| JP | 2007-41461 | 2/2007 |

OTHER PUBLICATIONS

Nogami et al, "Efficient Pairings on Twisted Elliptic Curve", 2008 Third International Conference and Hybrid Information Technology, Nov. 18, 2008, pp. 430-439.*

Avanzi et al, "Faster Scalar Multiplication on Koblitz Curves Combining Point Halving with the Frobenius Endomorphism", LNCS, vol. 2947, pp. 28-40, 2004.*

(Continued)

*Primary Examiner* — Jeffrey Nickerson
*Assistant Examiner* — Zakaria Zouaki
(74) *Attorney, Agent, or Firm* — Oblon, Spivak, McClelland, Maier & Neustadt, L.L.P.

(57) ABSTRACT

Provided are a scalar multiplier and a scalar multiplication program for performing a scalar multiplication at a high speed. In computing a scalar multiplication $[s]P$ of a rational point P of an additive group $E(F_p)$ including rational points on an elliptic curve where a characteristic p, an order r, and a trace t of a Frobenius endomorphism at an embedding degree $k=12$ using an integer variable $\chi$ are given by: $p(\chi)=36\chi^4 - 36\chi^3+24\chi^2-6\chi+1$, $r(\chi)=36\chi^4-36\chi^3+18\chi^2-6\chi+1=p(\chi)+1-t(\chi)$, $t(\chi)=6\chi^2+1$, the scalar multiplication $[s]P$ is computed as: $[s]P=([A]\phi'_2+[B])P$, using a Frobenius map $\phi'_2$ given by: $[p^2]P=\phi'_2(P)$ assuming that a twist degree d is 6 and a positive integer e is 2 where $k=d\times e$.

4 Claims, 2 Drawing Sheets

OTHER PUBLICATIONS

Yumi et al, "An Improvement of Twisted Ate Pairing with Barreto-Naehrig Curve by using Frobenius Mapping", 2008 Third International Conference and Hybrid Information Technology, Aug. 2008, pp. 406-410.*

International Search Report issued Mar. 2, 2010 in Application No. PCT/JP2009/070127.

Yasuyuki Nogami, et al., "Efficient Pairings on Twisted Elliptic Curve", 2008 Third Int'l Conference on Convergence and Hybrid Informaion Technology, 2008, pp. 430-439.

Masataka Akane, et al., "Ate Pairing ni Tekishita Barreto-Naehrig Kyokosen no Parameter Settei", Computer Society Symposium 2007, vol. 2007, No. 10, pp. 495-500 (With English Abstract).

Roberto Maria Avanzi, et al., "Faster Scalar Multiplication on Koblitz Curves combining Point Halving with the Frobenius Endomorphism", LNCS, vol. 2947, 2004, pp. 28-40.

Masataka Akane, et al., "Fast Ate Pairing Computation of Embedding Degree 12 Using Subfield-Twisted Elliptic Curve", IEICE Transactions on Fundamentals of Electronics, Communications and Computer Sciences, vol. E92-A, No. 2, 2009, pp. 508-516.

* cited by examiner

SCALAR MULTIPLIER AND SCALAR MULTIPLICATION PROGRAM

TECHNICAL FIELD

The present invention relates to a scalar multiplier and a scalar multiplication program for performing a scalar multiplication [s]P of a rational point P.

BACKGROUND ART

Conventionally, various services such as Internet banking and electronic applications with administrative agencies have been provided using telecommunication circuits such as the Internet.

To use such services, an authentication process is required to ensure that users of the services are not spoofers or fictitious persons but are correct users. Thus, an electronic authentication technique based on public key cryptography using a public key and a secret key has been frequently employed as a highly reliable authentication method.

Recently, an authentication system using ID-based encryption or a group signature has been developed in order to easily and efficiently manage more users.

In the ID-based encryption or group signature, a necessary exponentiation or scalar multiplication is performed together with a pairing computation. These computations are required to be performed at a high speed in order to shorten the time necessary for the authentication process as much as possible.

Therefore, developed is a technique of enhancing the speed of such exponentiation or scalar multiplication by using a binary method, a window method, or other methods.

Moreover, developed is a technique of enhancing the speed of scalar multiplication by reducing the number of computations using mapping (see Patent Document 1 and Patent Document 2, for example).

Patent Document 1: Japanese Patent Application Publication No. 2004-271792

Patent Document 2: Japanese Patent Application Publication No. 2007-41461

DISCLOSURE OF INVENTION

Problems to be Solved by the Invention

However, reduction of the number of computations simply using mapping alone does not sufficiently enhance the speed. Particularly, it is difficult to complete an authentication process intended for over 10,000 users within a few seconds, and therefore, the technique may not be sufficient for practical applications.

In view of the present situation, the present inventors have conducted research and development to improve practicality by enhancing the speed of scalar multiplication and have achieved the present invention.

Means for Solving the Problems

A scalar multiplier of the present invention is a scalar multiplier that computes a scalar multiplication [s]P of a rational point P of an additive group $E(F_p)$ including rational points on an elliptic curve where a characteristic p, an order r, and a trace t of a Frobenius endomorphism at an embedding degree k=12 using an integer variable $\chi$ are given by:

$$p(\chi)=36\chi^4-36\chi^3+24\chi^2-6\chi+1,$$

$$r(\chi)=36\chi^4-36\chi^3+18\chi^2-6\chi+1=p(\chi)+1-t(\chi),$$

$$t(\chi)=6\chi^2+1,$$

the scalar multiplier comprising, to compute the scalar multiplication [s]P as:

$$[s]P=([s_4+s_5]\phi'_2+[s_2-s_5])P,$$

using a Frobenius map $\phi'_2$ given by:

$$[p^2]P=\phi'_2(P)$$

assuming that a twist degree d is 6 and a positive integer e is 2 where k=d×e to give:

$$[6\chi^2-4\chi+1]P=[(-2\chi+1)p^2]P=[-2\chi+1]\chi'_2(P),$$

computing v-adic expansion of the scalar s using $6\chi^2-4\chi+1=v$ to give:

$$s=s_1v+s_2,\ s_2<v,\ \text{and}$$

$$s\equiv(-2\chi+1)s_1p^2+s_2\bmod r,$$

computing v-adic expansion of the $(-2\chi+1)s_1$ part to give:

$$s\equiv(s_3v+s_4)p^2+s_2\equiv s_3p^4+s_4p^2+s_2\bmod r$$

where $p^4\equiv p^2-1\bmod r$, and using $$s\equiv(s_4+s_5)p^2+(s_2-s_5)\bmod r:$$

storage means for storing the value of the scalar s; and first to fifth auxiliary storage means for storing the coefficients $s_1$, $s_2$, $s_3$, $s_4$, and $s_5$, respectively, wherein a value obtained by computing v-adic expansion of the scalar s is stored in the first auxiliary storage means and the second auxiliary storage means, a value obtained by computing v-adic expansion of $(-2\chi+1)s_1$ are stored in the third auxiliary storage means and the fourth auxiliary storage means, and the value of $(-2\chi+1)s_3$ is stored in the fifth auxiliary storage means.

A scalar multiplication program of the present invention is a scalar multiplication program that causes an electronic computer including a central processing unit (CPU) to compute a scalar multiplication [s]P of a rational point P of an additive group $E(F_p)$ including rational points on an elliptic curve where a characteristic p, an order r, and a trace t of a Frobenius endomorphism at an embedding degree k=12 using an integer variable $\chi$ are given by:

$$p(\chi)=36\chi^4-36\chi^3+24\chi^2-6\chi+1,$$

$$r(\chi)=36\chi^4-36\chi^3+18\chi^2-6\chi+1=p(\chi)+1-t(\chi),$$

$$t(\chi)=6\chi^2+1,$$

the scalar multiplication program comprising, to cause the electronic computer to compute the scalar multiplication [s]P as:

$$[s]P=([s_4+s_5]\phi'_2+[s_2-s_5])P,$$

using a Frobenius map $\phi'_2$ given by:

$$[p^2]P=\phi'_2(P)$$

assuming that a twist degree d is 6 and a positive integer e is 2 where k=d×e to give:

$$[6\chi^2-4\chi+1]P=[(-2\chi+1)p^2]P=[-2\chi+1]\phi'_2(P),$$

computing v-adic expansion of the scalar s using $6\chi^2-4\chi+1=v$ to give:

$$s=s_1v+s_2,\ s_2<v,\ \text{and}$$

$$s\equiv(-2\chi+1)s_1p^2+s_2\bmod r,$$

computing v-adic expansion of the $(-2\chi+1)s_1$ part to give:

$$s\equiv(s_3v+s_4)p^2+s_2\equiv s_3p^4+s_4p^2+s_2\bmod r$$

where $p^4 \equiv p^2-1 \mod r$, and
using $$s \equiv (s_4+s_5)p^2+(s_2-s_5) \mod r:$$

storing the $s_1$ and the $s_2$ obtained by computing v-adic expansion of the scalar s in a first register and a second register, respectively, storing the $s_3$ and the $s_4$ obtained by computing v-adic expansion of $(-2\chi+1)s_1$ in a third register and a fourth register, respectively, and storing the value of $(-2\chi+1)s_3$ as the value of the $s_5$ in a fifth register.

A scalar multiplier of the present invention is a scalar multiplier that computes a scalar multiplication [s]P of a rational point P of an additive group $E(F_p)$ including rational points on an elliptic curve where a characteristic p, an order r, and a trace t of a Frobenius endomorphism at an embedding degree k=8 using an integer variable $\chi$ are given by:

$$p(\chi)=(81\chi^6+54\chi^5+45\chi^4+12\chi^3+13\chi^2+6\chi+1)/4,$$

$$r(\chi)=9\chi^4+12\chi^3+8\chi^2+4\chi+1,$$

$$t(\chi)=-9\chi^3-3\chi^2-2\chi,$$

the scalar multiplier comprising, to compute the scalar multiplication [s]P as:

$$[s]P=([s_4]\phi'_2+[s_2-s_5])P,$$

using a Frobenius map $\phi'_2$ given by:

$$[p^2]P=\phi'_2(P)$$

assuming that a twist degree d is 4 and a positive integer e is 2 where k=d×e to give:

$$[3\chi^2+2\chi]P=[(-2\chi-1)p^2]P=[-2\chi-1]\phi'_2(P),$$

computing v-adic expansion of the scalar s using $3\chi^2+2\chi=v$ to give:

$$s=s_1v+s_2, s_2<v, \text{ and}$$

$$s\equiv(-2\chi-1)s_1p^2+s_2 \mod r,$$

computing v-adic expansion of the $(-2\chi-1)s_1$ part to give:

$$s\equiv(s_3v+s_4)p^2+s_2\equiv s_5p^4+s_4p^2+s_2 \mod r$$

where $p^4 \equiv -1 \mod r$, and
using $$s\equiv s_4p^2+(s_2-s_5) \mod r:$$

storage means for storing the value of the scalar s; and
first to fifth auxiliary storage means for storing the coefficients $s_1$, $s_2$, $s_3$, $s_4$, and $s_5$, respectively, wherein a value obtained by computing v-adic expansion of the scalar s is stored in the first auxiliary storage means and the second auxiliary storage means, a value obtained by computing v-adic expansion of $(-2\chi-1)s_1$ is stored in the third auxiliary storage means and the fourth auxiliary storage means, and the value of $(-2\chi-1)s_3$ are stored in the fifth auxiliary storage means.

A scalar multiplication program of the present invention is a scalar multiplication program that causes an electronic computer including a central processing unit (CPU) to compute a scalar multiplication [s]P of a rational point P of an additive group $E(F_p)$ including rational points on an elliptic curve where a characteristic p, an order r, and a trace t of a Frobenius endomorphism at an embedding degree k=8 using an integer variable $\chi$ are given by:

$$p(\chi)=(81\chi^6+54\chi^5+45\chi^4+12\chi^3+13\chi^2+6\chi+1)/4,$$

$$r(\chi)=9\chi^4+12\chi^3+8\chi^2+4\chi+1,$$

$$t(\chi)=-9\chi^3-3\chi^2-2\chi,$$

the scalar multiplication program comprising, to cause the electronic computer to compute the scalar multiplication [s]P as:

$$[s]P=([s_4]\phi'_2+[s_2-s_5])P,$$

using a Frobenius map $\phi'_2$ given by:

$$[p^2]P=\phi'_2(P)$$

assuming that a twist degree d is 4 and a positive integer e is 2 where k=d×e to give:

$$[3\chi^2+2\chi]P=[(-2\chi-1)p^2]P=[-2\chi-1]\phi'_2(P),$$

computing v-adic expansion of the scalar s using $3\chi^2+2\chi=v$ to give:

$$s=s_1v+s_2, s_2=v, \text{ and}$$

$$s\equiv(-2\chi-1)s_1p^2+s_2 \mod r,$$

computing v-adic expansion of the $(-2\chi-1)s_1$ part to give:

$$s\equiv(s_3v+s_4)p^2+s_2\equiv s_5p^4+s_4p^2+s_2 \mod r$$

where $p^4 \equiv -1 \mod r$, and
using $$s\equiv s_4p^2+(s_2-s_5) \mod r:$$

storing the $s_1$ and the $s_2$ obtained by computing v-adic expansion of the scalar s in a first register and a second register, respectively, storing the $s_3$ and the $s_4$ obtained by computing v-adic expansion of $(-2\chi-1)s_1$ in a third register and a fourth register, respectively, and storing the value of $(-2\chi-1)s_3$ as the value of the $s_5$ in a fifth register.

Effects of the Invention

According to the present invention, when a scalar multiplication [s]P is computed, the computing amount of the scalar multiplication [s]P can be reduced by about half by computing v-adic expansion of a scalar s to reduce the size of the scalar s and using a Frobenius map $\phi'_2(P)$ satisfying:

$$[p^2]P=\phi'_2(P).$$

Therefore, it is possible to enhance the speed of the scalar multiplication.

Figure 1:
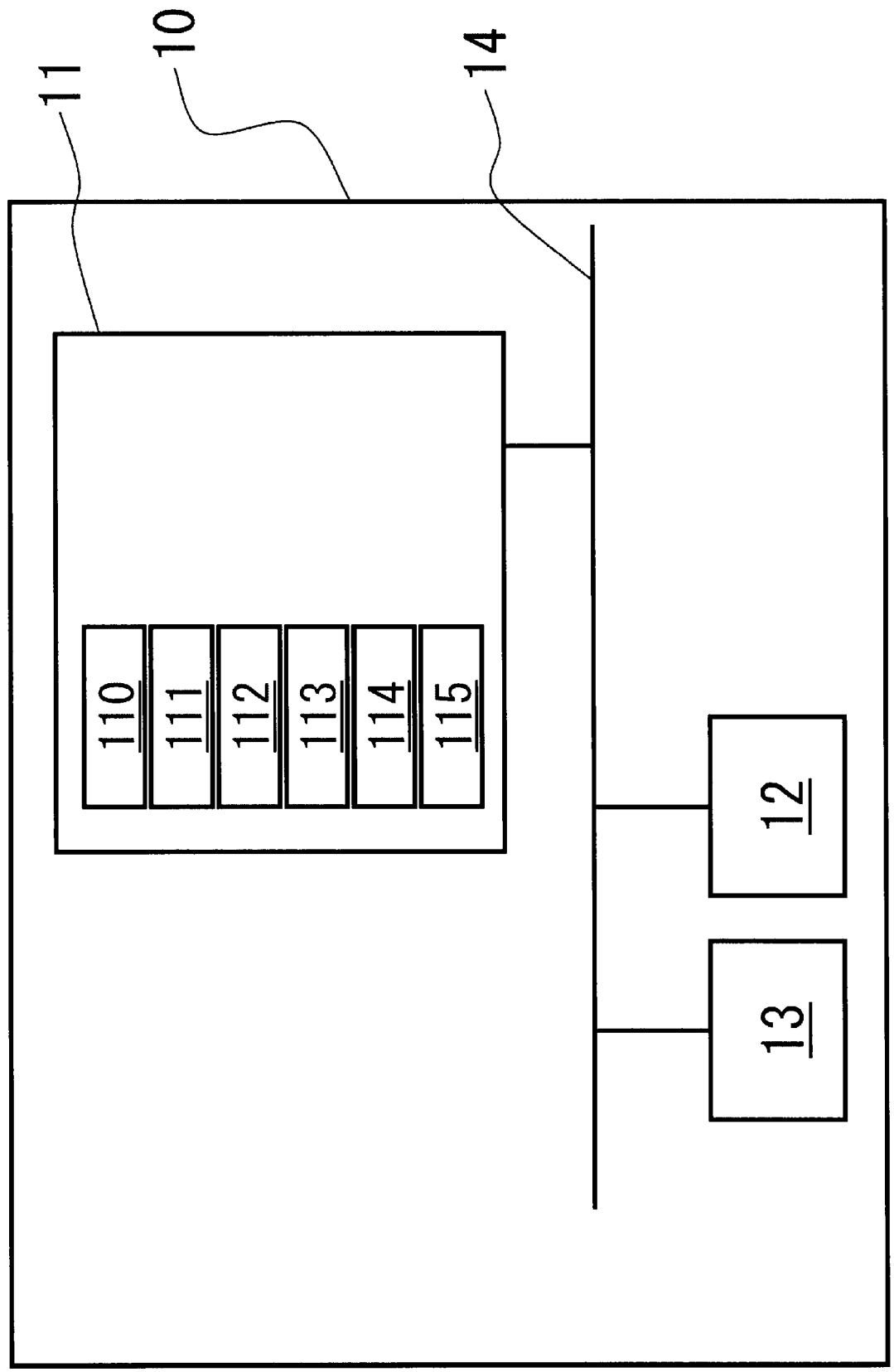
FIG. 1 is a schematic view of an electronic computer including a scalar multiplier according to an embodiment of the present invention.

DESCRIPTION OF THE REFERENCE SIGNS 10 electronic computer
11 CPU
12 storage device
13 memory device
14 bus
110 register for scalar value
111 first register
112 second register

113 third register
114 fourth register
115 fifth register 5

BEST MODE(S) FOR CARRYING OUT THE INVENTION

For describing an embodiment of the present invention, a case of an embedding degree k=12 is described, and then, a case of an embedding degree k=8 is described.

A scalar multiplication executed by a scalar multiplier and a scalar multiplication program according to the embodiment of the present invention is a scalar multiplication [s]P of a rational point P of an additive group $E(F_p)$ including rational points on an elliptic curve where a characteristic p, an order r, and a trace t of a Frobenius endomorphism at an embedding degree k=12 are given by:

$$p(\chi)=36\chi^4-36\chi^3+24\chi^2-6\chi+1, \quad \text{(Equation 1)}$$

$$r(\chi)=36\chi^4-36\chi^3+18\chi^2-6\chi+1=p(\chi)+1-t(\chi), \quad \text{(Equation 2)}$$

$$t(\chi)=6\chi^2+1, \quad \text{(Equation 3)}.$$

The elliptic curve is known as a Barreto-Naehrig curve (hereinafter, referred to as a "BN curve") that is a type of pairing-friendly curves.

The presence of a subfield twist curve is known relative to the elliptic curve represented by this BN curve. Particularly, with the embedding degree k=12, a sextic twist curve is known, and a Frobenius map $\phi'_2$ satisfying:

$$[p^2]P=\phi'_2(P)$$

is known.

While using a technique capable of enhancing the speed of scalar computation using this Frobenius map $\phi'_2$, the present invention enhances the speed of scalar computation using relational expressions described below.

Equation below is obtained from Equation 2.

$$36\chi^4-36\chi^3+18\chi^2-6\chi+1\equiv 0 \bmod r \quad \text{(Equation 4)}$$

Since p≡t−1 mod r, Equation below is obtained.

$$p^2-6\chi p+3p-6\chi+1\equiv 0 \bmod r \quad \text{(Equation 5)}$$

Equation below is obtained by transforming Equation 5.

$$(-6\chi+3)p\equiv -p^2+6\chi-1 \bmod r \quad \text{(Equation 6)}$$

Equation below is obtained by squaring both sides of Equation 6.

$$(-6\chi 3)^2 p^2 \equiv (p^2-6\chi+1)^2 \bmod r;$$

$$36\chi^2 p^2-36\chi p^2+9p^2 \equiv p^4-12\chi p^2+2p^2+36\chi^2-12\chi+1 \bmod r \quad \text{(Equation 7)}$$

Equation below is obtained by further transforming Equation 7 using $p^4+1\equiv p^2$ mod r.

$$36\chi^2 p^2-36\chi p^2+9p^2 \equiv -12\chi p^2+3p^2+36\chi^2-12\chi \bmod r;$$

$$36\chi^2(p^2-1)\equiv (24\chi-6)p^2-12\chi \bmod r;$$

$$6\chi^2(p^2-1)\equiv (4\chi-1)p^2-2\chi \bmod r \quad \text{(Equation 8)}$$

Equation 8 can be transformed into Equation below using $$p^4-p^2+1\equiv 0 \bmod r \quad \text{(Equation 9)},$$

$$-p^2(p^2-1)\equiv 1 \bmod r \quad \text{(Equation 10), and}$$

$$(p^2-1)^{-1}\equiv p^2 \bmod r \quad \text{(Equation 11)},$$

when both sides of Equation 8 are multiplied by $(p^2-1)^{-1}$.

$$6\chi^2\equiv -(4\chi-1)p^4+2\chi p^2\equiv -(4\chi-1)(p^2-1)+2\chi p^2 \bmod r \quad \text{(Equation 12)}$$

Thus, Equation below is obtained by transforming Equation 12.

$$6\chi^2-4\chi+1\equiv (-2\chi-1)p^2 \bmod r \quad \text{(Equation 13)}$$

Accordingly, the relational expression below of the Frobenius map $\phi'_2$ is obtained.

$$[6\chi^2-4\chi+1]P=[(-2\chi+1)p^2]P=[-2\chi+1]\phi'_2(P) \quad \text{(Equation 14)}$$

Subsequently, a scalar multiplication [s]p using the Frobenius map $\phi'_2$ is considered. Here, $$v=6\chi^2-4\chi+1 \quad \text{(Equation 15)}$$

is given for the sake of convenience.

In this case, v-adic expansion of a scalar s can be expressed by Equation below.

$$s=s_1v+s_2, s_2<v \quad \text{(Equation 16)}$$

Here, Equation 16 can be expressed by Equation below using Equation 15 and Equation 14.

$$s\equiv (-2\chi+1)s_1 p^2+s_2 \bmod r \quad \text{(Equation 17)}$$

$(-2\chi+1)s_1$ may be greater than v. Therefore, Equation below is expressed by further computing v-adic expansion of $(-2\chi+1)s_1$.

$$s\equiv (s_3v+s_4)p^2+s_2 \bmod r \quad \text{(Equation 18)}$$

Here, $s_3 vp^2\equiv (-2\chi+1)s_3 p^4$ is given using Equation 14, and thus, Equation 18 can be expressed by Equation below using $(-2\chi+1)s_3=s_5$.

$$s\equiv s_5 p^4+s_4 p^2+s_2 \bmod r \quad \text{(Equation 19)}$$

In this case, while $s_4$ and $s_2$ are smaller than v, $s_5$ may not be smaller than v. Even in such case, $s_5$ does not become problematically large.

Equation 19 can be transformed into Equation below using $p^4\equiv p^2-1$ mod r transformed from Equation 9.

$$s\equiv s_5(p^2-1)+s_4 p^2+s_2\equiv (s_4+s_5)p^2+(s_2-s_5)\bmod r \quad \text{(Equation 20)}$$

Here, $$A=s_4+s_5 \quad \text{(Equation 21), and}$$

$$B=s_2-s_5 \quad \text{(Equation 22)}$$

are given, and the scalar multiplication [s]P can be computed as:

$$[s]P=([A]\phi'_2+[B])P \quad \text{(Equation 23)}$$

Therefore, for example, when a scalar multiplication with a 256-bit scalar s is computed, A and B are 128 bits in size, and thus, the computing amount can be reduced by about half to enhance the speed of the scalar multiplication.

The scalar multiplier that performs the scalar multiplication described above is configured to include an electronic computer 10 as illustrated in FIG. 1. The electronic computer 10 includes a central processing unit (CPU) 11 that performs a computation process, a storage device 12 such as a hard disk that stores therein a scalar multiplication program, data of rational points to be used in the scalar multiplication program, and the like, and a memory device 13 including a random-access memory (RAM) that loads the scalar multiplication program to be executable and that temporarily stores therein data generated during the scalar multiplication program execution, and the like. In FIG. 1, 14 denotes a bus.

In the embodiment of the present invention, a register 110 for scalar value that stores therein the value of the scalar s is provided as storage means in the CPU 11. First to fifth registers 111, 112, 113, 114, and 115 that store therein the values of coefficients $s_1$, $s_2$, $s_3$, $s_4$, and $s_5$, respectively, generated during v-adic expansion of the scalar s as described above are further provided as first to fifth auxiliary storage means in the CPU 11. The storage means configured as the register 110 for scalar value and the first to fifth auxiliary storage means configured as the first to fifth registers 111, 112, 113, 114, and 115 may not be provided in the CPU 11 but may be provided in storage means such as the memory device 13 except for the CPU 11.

When a scalar multiplication needs to be executed, the electronic computer 10 functioning as a scalar multiplier starts a scalar multiplication program to execute the scalar multiplication.

Figure 2:
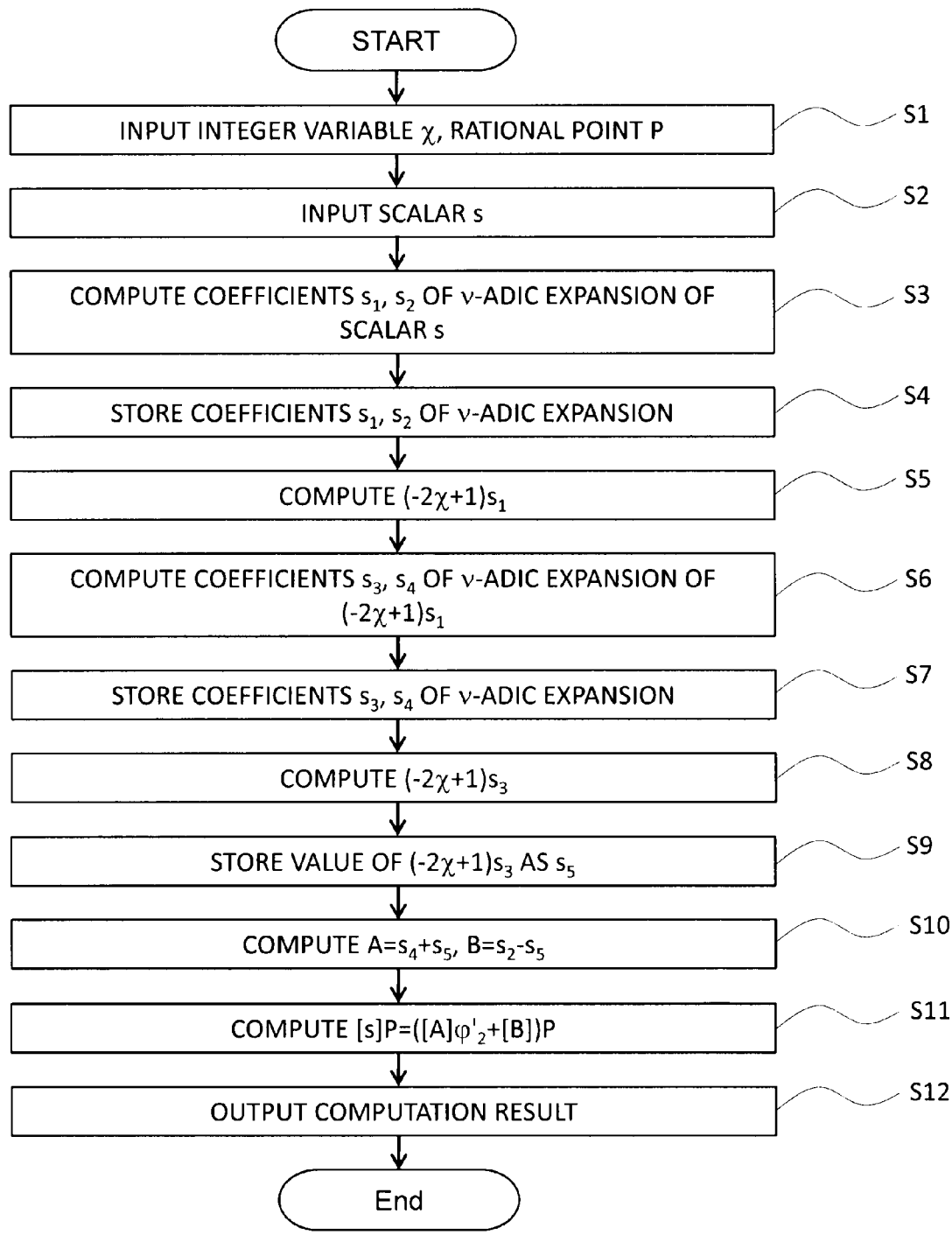
FIG. 2 is a flowchart of a scalar multiplication program according to the embodiment of the present invention.

In other words, the electronic computer 10 performs the scalar multiplication based on the flowchart illustrated in FIG. 2 using the started scalar multiplication program to output a computation result.

Using the started scalar multiplication program, the electronic computer 10 makes the CPU 11 function as input means to read data of an integer variable $\chi$ and data of the rational point P that are stored in the storage device 12 or the memory device 13 and input the data into respective specified registers provided in the CPU 11 (Step S1).

Moreover, the electronic computer 10 makes the CPU 11 function as input means using the scalar multiplication program and input the value of the scalar s for a scalar multiplication. The CPU 11 is made to function as storage means to store the input value of the scalar s in the register 110 for scalar value (Step S2).

Subsequently, the electronic computer 10 makes the CPU 11 function as computation means using the scalar multiplication program to compute v-adic expansion of the scalar s as described above and calculate $s_1$ and $s_2$ that are coefficients of the v-adic expansion (Step S3). In other words, the coefficient $s_1$ is the quotient obtained by dividing the scalar s by v, and the coefficient $s_2$ is the remainder obtained by dividing the scalar s by v.

The CPU 11 is made to function as storage means and store the values of $s_1$ and $s_2$ that are calculated coefficients of the v-adic expansion, respectively, in the first register 111 and the second register 112 (Step S4).

Subsequently, the electronic computer 10 makes the CPU 11 function as computation means to calculate the value of $(-2\chi+1)s_1$ (Step S5) and compute v-adic expansion of $(-2\chi+1)s_1$ as described above to calculate $s_3$ and $s_4$ that are coefficients of the v-adic expansion (Step S6). In other words, the coefficient $s_3$ is the quotient obtained by dividing $(-2\chi+1)s_1$ by v, and the coefficient $s_4$ is the remainder obtained by dividing $(-2\chi+1)s_1$ by v.

The CPU 11 is made to function as storage means to store the values of $s_3$ and $s_4$ that are calculated coefficients of the v-adic expansion of $(-2\chi+1)s_1$, respectively, in the third register 113 and the fourth register 114 (Step S7).

The electronic computer 10 makes the CPU 11 function as computation means to compute the value of $(-2\chi+1)s_3$ (Step S8) and stores the value in the fifth register 115 (Step S9).

Subsequently, the electronic computer 10 makes the CPU 11 function as computation means to compute the value of $s_4+s_5$ and the value of $s_2-s_5$ using the values stored in the first to fifth registers 11, 112, 113, 114, and 115 (Step S10).

The computed value of $s_4+s_5$ and value of $s_2-s_5$ are stored in respective specified registers. $s_4+s_5=A$ and $s_2-s_5=B$ are given for the sake of convenience.

Subsequently, the electronic computer 10 makes the CPU 11 function as computation means to calculate the scalar multiplication [s]P as $[s]P=([A]\phi'_2+[B])P$ (Step S11). When the size of the values of A and B is about half the size of the scalar s, the computation time can be significantly reduced. In a computer simulation, the speed of the computation can be enhanced by about 40% as compared with a scalar multiplication performed by a general binary method.

The computation of $[s]P=([A]\phi'_2+[B])P$ performed in Step S11 is specifically performed as follows.

The electronic computer 10 includes a register R for computation result that stores therein a computation result of the scalar computation [s]P and a first auxiliary register C and a second auxiliary register D that temporarily store therein values necessary for computation.

As an initialization process, the electronic computer 10 sets the register R for computation result to zero element, assigns $\phi'_2(P)$ into the first auxiliary register C, and assigns the rational point P into the second auxiliary register D.

Assuming that values of the A and B described above at the i-th digit displayed in binary are expressed as $A_i$ and $B_i$, the electronic computer 10 executes the following computation loop over the whole digits of A and B.

If $A_i=1$ and $B_i=1$ at the i-th digit, the sum of the register R for computation result and the second auxiliary register D is substituted into the register R for computation result. That is, $R \leftarrow R+D$.

If $A_i=1$ and $B_i=0$ at the i-th digit, the sum of the register R for computation result and the first auxiliary register C is substituted into the register R for computation result. That is, $R \leftarrow R+C$.

If $A_i=0$ and $B_i=1$ at the i-th digit, the sum of the register R for computation result and the rational point P is substituted into the register R for computation result. That is, $R \leftarrow R+P$.

Then, the sum of the register R for computation result and the register R for computation result is substituted into the register R for computation result. That is, $R \leftarrow R+R$.

Subsequently, the electronic computer 10 performs the scalar computation [s]P by computing the whole digits of A and B while shifting the digits of $A_i$ and $B_i$ by decrementing or incrementing the digits to enable the output of a computation result.

Because A is computed in parallel with B, the computation of the embodiment of the present invention can maximize the advantageous effect of the size of the values of A and B being about half the size of the scalar s.

The case of an embedding degree k=8 will be described below.

With the embedding degree k=8, the scalar multiplication according to the embodiment of the present invention is a scalar multiplication [s]P of a rational point P of an additive group $E(F_p)$ including rational points on a BN curve where a characteristic p, an order r, and a trace t of a Frobenius endomorphism are given by:

$$p(\chi)=(81\chi^6+54\chi^5+45\chi^4+12\chi^3+13\chi^2+6\chi+1)/4,$$

$$r(\chi)=9\chi^4+12\chi^3+8\chi^2+4\chi+1,$$

$$t(\chi)=-9\chi^3-3\chi^2-2\chi.$$

Also in this case, the presence of a subfield twist curve is known. Particularly, with the embedding degree k=8, a quartic twist curve is known, and a Frobenius map $\phi'_2$ satisfying:

$$[p^2]P=\phi'_2(P)$$

is known.

In the case of the embedding degree k=8, the relational expression:

$$[3\chi^2+2\chi]P=[(-2\chi-1)p^2]P=[-2\chi-1]\phi'_2(P) \quad \text{(Equation 24)}$$

is used instead of Equation 14.

Similarly to the case of the embedding degree k=12, the v-adic expansion of the scalar s is computed using $3\chi^2 2\chi = v$, and can be expressed as Equation below.

$$s = s_1 v + s_2, \ s_2 < v \quad \text{(Equation 25)}$$

Here, Equation 25 can be expressed by Equation below using Equation 24.

$$s \equiv (-2\chi - 1)s_1 p^2 + s_2 \bmod r \quad \text{(Equation 26)}$$

$(-2\chi - 1)s_1$ may be greater than v. Therefore, Equation below may be expressed by further computing v-adic expansion of $(-2\chi - 1)s_1$.

$$s \equiv (s_3 v + s_4)p^2 + s_2 \bmod r \quad \text{(Equation 27)}$$

Here, $s_3 v p^2 \equiv (-2\chi - 1)s_3 p^4$ is given using Equation 24, and thus, Equation 27 can be expressed by Equation below using $(-2\chi - 1)s_3 = s_5$.

$$s \equiv s_5 p^4 + s_4 p^2 + s_2 \bmod r \quad \text{(Equation 28)}$$

In this case, while $s_4$ and $s_2$ are smaller than v, $s_5$ may not be smaller than v. Even in such case, $s_5$ does not become problematically large.

With the embedding degree k=8, Equation 28 can be transformed into Equation below using $p^4 \equiv -1 \bmod r$.

$$s \equiv -s_5 s_4 p^2 + s_2 \equiv s_4 p^2 + (s_2 - s_5) \bmod r \quad \text{(Equation 29)}$$

Here, $$A = s_4 \quad \text{(Equation 30), and}$$

$$B = s_2 - s_5 \quad \text{(Equation 31)}$$

are given, and the scalar multiplication [s]P can be computed as:

$$[s]P = ([A]\phi'_2 + [B])P$$

similarly to the case of the embedding degree k=12.

Therefore, comparing the case of the embedding degree k=8 and the case of the embedding degree k=12, the difference is only the formula to find the value to be stored in the fifth register 115 and the value of A in Equation 30. Accordingly, the computation with the embedding degree k=8 can be performed similarly to that with the embedding degree k=12.

Thus, a scalar multiplier in the case of the embedding degree k=8 is assumed to be the same as the scalar multiplier in the case of the embedding degree k=12, $(-2\chi - 1)s_3$ is used as the formula in Step S8 of the flowchart illustrated in FIG. 2, $(-2\chi - 1)s_3$ is used as the value of $s_5$ in Step S9, and $A = s_4$ is used in Step S10.

Accordingly, even with the embedding degree k=8, the size of the values of A and B is about half the size of the scalar s, and thus, the computation time of the scalar multiplication [s]P can be significantly reduced.

INDUSTRIAL APPLICABILITY

The present invention can enhance the speed of the scalar multiplication required during computation of a group signature to enhance the speed of a group signature process.

The invention claimed is:
1. A processing device comprising:
 a processor configured to:
  compute a scalar multiplication [s]P of a rational point P of an additive group $E(F_p)$ including rational points on an elliptic curve where a characteristic p, an order r, and a trace t of a Frobenius endomorphism at an embedding degree k=12 using an integer variable $\chi$ are given by:

$$p(\chi) = 36\chi^4 - 36\chi^3 + 24\chi^2 - 6\chi + 1,$$

$$r(\chi) = 36\chi^4 - 36\chi^3 + 18\chi^2 - 6\chi + 1 = p(\chi) + 1 - t(\chi),$$

$$t(\chi) = 6\chi^2 + 1;$$

compute the scalar multiplication [s]P as:

$$[s]P = ([s_4 + s_5]\phi'_2 + [s_2 - s_5])P,$$

using a Frobenius map $\phi'_2$ given by:

$$[p^2]P = \phi'_2(P)$$

assuming that a twist degree d is 6 and a positive integer e is 2 where k=d×e to give:

$$[6\chi^2 - 4\chi + 1]P = [(-2\chi + 1)p^2]P = [-2\chi + 1]\phi'_2(P);$$

compute a v-adic expansion of the scalar s using $6\chi^2 - 4\chi + 1 = v$ to give:

$$s = s_1 v + s_2, \ s_2 < v, \text{ and}$$

$$s \equiv (-2\chi + 1)s_1 p^2 + s_2 \bmod r;$$

compute a v-adic expansion of the $(-2\chi + 1)s_1$ part to give:

$$s \equiv (s_3 v + s_4)p^2 + s_2 \equiv s_5 p^4 + s_4 p^2 + s_2 \bmod r$$

where $p^4 \equiv p^2 - 1 \bmod r$, and
using $$s \equiv (s_4 + s_5)p^2 + (s_2 - s_5) \bmod r;$$

calculate a group signature based on the computed scalar multiplication [s]P, the computed v-adic expansion of the scalar s using $6\chi^2 - 4\chi + 1 = v$, and the computed a v-adic expansion of the $(-2\chi + 1)s_1$;
 use the calculated group signature in an authentication process;
a storage device configured to store the value of the scalar s; and
wherein the storage device is further configured to store the coefficients $s_1$, $s_2$, $s_3$, $s_4$, and $s_5$, respectively;
wherein a value obtained by computing v-adic expansion of the scalar s is stored in the storage device;
wherein a value obtained by computing v-adic expansion of $(-2\chi + 1)s_1$ is stored in the storage device; and
wherein the value of $(-2\chi + 1)s_3$ is stored in the storage device.

2. A non-human article of manufacture comprising:
a non-transitory computer readable medium containing a scalar multiplication program that, when executed, causes an electronic computer including a central processing unit (CPU) to perform the following:
compute a scalar multiplication [s]P of a rational point P of an additive group $E(F_p)$ including rational points on an elliptic curve where a characteristic p, an order r, and a trace t of a Frobenius endomorphism at an embedding degree k=12 using an integer variable $\chi$ are given by:

$$p(\chi) = 36\chi^4 - 36\chi^3 + 24\chi^2 - 6\chi + 1,$$

$$r(\chi) = 36\chi^4 - 36\chi^3 + 18\chi^2 - 6\chi + 1 = p(\chi) + 1 - t(\chi),$$

$$t(\chi) = 6\chi^2 + 1;$$

compute the scalar multiplication [s]P as:

$$[s]P = ([s_4 + s_5]\phi'_2 + [s_2 - s_5])P,$$

using a Frobenius map $\phi'_2$ given by:

$$[p^2]P = \phi'_2(P)$$

assuming that a twist degree d is 6 and a positive integer e is 2 where k=d×e to give:

$$[6\chi^2 - 4\chi + 1]P = [(-2\chi + 1)p^2]P = [-2\chi + 1]\phi'_2(P);$$

compute a v-adic expansion of the scalar s using $6\chi^2-4\chi+1=v$ to give:

$$s=s_1v+s_2,\ s_2<v,\ \text{and}$$

$$s\equiv(-2\chi+1)s_1p^2+s_2\bmod r;$$

compute a v-adic expansion of the $(-2\chi+1)s_1$ part to give:

$$s\equiv(s_3v+s_4)p^2+s_2\equiv s_5p^4+s_4p^2+s_2\bmod r$$

where $p^4\equiv p^2-1\bmod r$, and
using $$s\equiv(s_4+s_5)p^2+(s_2-s_5)\bmod r;$$

calculate a group signature based on the computed scalar multiplication [s]P, the computed v-adic expansion of the scalar s using $6\chi^2-4\chi+1=v$, and the computed v-adic expansion of the $(-2\chi+1)s_1$;
use the calculated group signature in an authentication process;
store the $s_1$ and the $s_2$ obtained by computing v-adic expansion of the scalar s in a storage device;
store the $s_3$ and the $s_4$ obtained by computing v-adic expansion of $(-2\chi+1)s_1$ in the storage device; and
store the value of $(-2\chi+1)s_3$ as the value of the $s_5$ in the storage device.

3. A processing device comprising:
a processor configured to:
compute a scalar multiplication [s]P of a rational point P of an additive group $E(F_p)$ including rational points on an elliptic curve where a characteristic p, an order r, and a trace t of a Frobenius endomorphism at an embedding degree k=8 using an integer variable $\chi$ are given by:

$$p(\chi)=(81\chi^6+54\chi^5+45\chi^4+12\chi^3+13\chi^2+6\chi+1)/4,$$

$$r(\chi)=9\chi^4+12\chi^3+8\chi^2+4\chi+1,$$

$$t(\chi)=-9\chi^3-3\chi^2-2\chi;$$

compute the scalar multiplication [s]P as:

$$[s]P=([s_4]\phi'_2+[s_2-s_5])P,$$

using a Frobenius map $\phi'_2$ given by:

$$[p^2]P=\phi'_2(P),$$

assuming that a twist degree d is 4 and a positive integer e is 2 where k=d×e to give:

$$[3\chi^2+2\chi]P=[(-2\chi-1)p^2]P=[-2\chi-1]\phi'_2(P);$$

compute a v-adic expansion of the scalar s using $3\chi^2+2\chi=v$ to give:

$$s=s_1v+s_2,\ s_2<v,\ \text{and}$$

$$s\equiv(-2\chi-1)s_1p^2+s_2\bmod r;$$

compute a v-adic expansion of the $(-2\chi-1)s_1$ part to give:

$$s\equiv(s_3v+s_4)p^2+s_2\equiv s_5p^4+s_4p^2+s_2\bmod r$$

where $p^4\equiv-1\bmod r$, and
using $$s\equiv s_4p^2+(s_2-s_5)\bmod r;$$

calculate a group signature based on the computed scalar multiplication [s]P, the computed v-adic expansion of the scalar s using $3\chi^2+2\chi=v$, and the computed v-adic expansion of the $(-2\chi-1)s_1$;
use the calculated group signature in an authentication process; and
a storage device configured to store the value of the scalar s;
wherein the storage device is further configured to store the coefficients $s_1$, $s_2$, $s_3$, $s_4$, and $s_5$, respectively;
wherein a value obtained by computing v-adic expansion of the scalar s is stored in the storage device;
wherein a value obtained by computing v-adic expansion of $(-2\chi-1)s_1$ is stored in the storage device; and
wherein the value of $(-2\chi-1)s_3$ is stored in the storage device.

4. A non-human article of manufacture comprising:
a non-transitory computer readable medium containing a scalar multiplication program that, when executed, causes an electronic computer including a central processing unit (CPU) to perform the following:
compute a scalar multiplication [s]P of a rational point P of an additive group $E(F_p)$ including rational points on an elliptic curve where a characteristic p, an order r, and a trace t of a Frobenius endomorphism at an embedding degree k=8 using an integer variable $\chi$ are given by:

$$p(\chi)=(81\chi^6+54\chi^5+45\chi^4+12\chi^3+13\chi^2+6\chi+1)/4,$$

$$r(\chi)=9\chi^4+12\chi^3+8\chi^2+4\chi+1,$$

$$t(\chi)=-9\chi^3-3\chi^2-2\chi;$$

compute the scalar multiplication [s]P as:

$$[s]P=([s_4]\phi'_2+[s_2-s_5])P,$$

using a Frobenius map $\chi'_2$ given by:

$$[p^2]P=\phi'_2(P)$$

assuming that a twist degree d is 4 and a positive integer e is 2 where k=d×e to give:

$$[3\chi^2+2\chi]P=[(-2\chi-1)p^2]P=[-2\chi-1]\phi'_2(P),$$

compute a v-adic expansion of the scalar s using $3\chi^2+2\chi=v$ to give:

$$s=s_1v+s_2,\ s_2<v,\ \text{and}$$

$$s\equiv(-2\chi-1)s_1p^2+s_2\bmod r;$$

compute a v-adic expansion of the $(-2\chi-1)s_1$ part to give:

$$s\equiv(s_3v+s_4)p^2+s_2\equiv s_5p^4+s_4p^2+s_2\bmod r$$

where $p^4\equiv-1\bmod r$, and
using $$s\equiv s_4p^2+(s_2-s_5)\bmod r;$$

calculate a group signature based on the computed scalar multiplication [s]P, the computed v-adic expansion of the scalar s using $3\chi^2+2\chi=v$, and the computed v-adic expansion of the $(-2\chi-1)s_1$;
use the calculated group signature in an authentication process;
store the $s_1$ and the $s_2$ obtained by computing v-adic expansion of the scalar s in a storage device;
store the $s_3$ and the $s_4$ obtained by computing v-adic expansion of $(-2\chi-1)s_1$ in a storage device; and
store the value of $(-2\chi-1)s_3$ as the value of the $s_5$ in the storage device.

\* \* \* \* \*